United States Patent
Kuo

(10) Patent No.: US 10,488,658 B2
(45) Date of Patent: Nov. 26, 2019

(54) DYNAMIC INFORMATION SYSTEM CAPABLE OF PROVIDING REFERENCE INFORMATION ACCORDING TO DRIVING SCENARIOS IN REAL TIME

(71) Applicant: Shanghai XPT Technology Limited, Shanghai (CN)

(72) Inventor: Bou-Chen Kuo, Taipei (TW)

(73) Assignee: Shanghai XPT Technology Limited, Shanghai (CN)

( * ) Notice: Subject to any disclaimer, the term of this patent is extended or adjusted under 35 U.S.C. 154(b) by 0 days.

(21) Appl. No.: 15/782,858

(22) Filed: Oct. 13, 2017

(65) Prior Publication Data

US 2018/0321491 A1    Nov. 8, 2018

(30) Foreign Application Priority Data

May 2, 2017  (CN) .......................... 2017 1 0302318

(51) Int. Cl.
| | | |
|---|---|---|
| *B60Q 1/00* | (2006.01) | |
| *H04N 7/18* | (2006.01) | |
| *G02B 27/01* | (2006.01) | |
| *B60R 1/00* | (2006.01) | |

(52) U.S. Cl.
CPC .......... *G02B 27/0103* (2013.01); *B60R 1/001* (2013.01); *B60R 2300/205* (2013.01); *G02B 2027/014* (2013.01); *G02B 2027/0196* (2013.01)

(58) Field of Classification Search
None
See application file for complete search history.

(56) References Cited

U.S. PATENT DOCUMENTS

| | | | |
|---|---|---|---|
| 2012/0068840 A1* | 3/2012 | Ozaki ...................... | B60R 1/00 340/456 |
| 2015/0160025 A1* | 6/2015 | Konig ................. | G01C 21/3415 701/410 |
| 2016/0207530 A1* | 7/2016 | Stanek .................. | B60W 30/09 |
| 2017/0129501 A1* | 5/2017 | Lee ....................... | B60W 50/14 |
| 2017/0213459 A1* | 7/2017 | Ogaz ........................ | G01S 5/22 |

\* cited by examiner

*Primary Examiner* — Carl Adams
(74) *Attorney, Agent, or Firm* — Winston Hsu

(57) ABSTRACT

Operating a dynamic information system includes a plurality of information collector collecting a plurality of environmental characteristics, and a control module generating an intuitive reality image layer of a vehicle and a plurality of intuitive add-on image layers corresponding to a plurality of predetermined driving scenario. When a condition of a predetermined driving scenario is met, a display module displays the intuitive reality image layer and at least one intuitive add-on image layer of the plurality of intuitive add-on image layers that corresponding to the predetermined driving scenario.

20 Claims, 7 Drawing Sheets

DYNAMIC INFORMATION SYSTEM CAPABLE OF PROVIDING REFERENCE INFORMATION ACCORDING TO DRIVING SCENARIOS IN REAL TIME

BACKGROUND OF THE INVENTION

1. Field of the Invention

This invention is related to a dynamic information system, especially to a dynamic information system capable of providing reference information according to the driving scenarios in real time.

2. Description of the Prior Art

When driving a vehicle, the driver has to concentrate on the traffic condition ahead while paying attention to the rear vehicles or the adjacent vehicles occasionally. Traditionally, to allow the driver to observe the environment around the vehicle, vehicles are usually equipped with a left side view mirror, a right side view mirror, and a rear view mirror for reflecting the images around the vehicle. However, the mirrors are disposed in different positions and are away from each other, so the driver has to turn his/her head to view the mirrors while paying attention to the traffic condition ahead. In addition, the visible regions covered by the mirrors are still limited, creating blind spots around the vehicle.

Besides, during driving, the driver also needs to pay attention to other information, such as the gasoline gauge, the speed of the vehicle, the weather, etc. Since different types of information are usually presented separately on the instrument panel or the control panel, the driver can be distracted by the variety of information, causing various burdens to the driver. That is, since the driver does not need all information at all times, the driver may be distracted by information which may be irrelevant at a certain time. Therefore, how to provide a convenient, safe, and directly perceiving environment while providing relevant information instantly to the driver has become an issue to be solved.

SUMMARY OF THE INVENTION

One embodiment of the present invention discloses a dynamic information system. The dynamic information system includes a plurality of information collectors, a control module, and a display module.

The control module is coupled to the plurality of information collectors, and generate an intuitive reality image layer of a vehicle and a plurality of intuitive add-on image layers corresponding to a plurality of predetermined driving scenarios. The display module is coupled to the control module, and displays the intuitive reality image layer or in addition with at least one intuitive add-on image layer corresponding to a predetermined driving scenario when a condition of the predetermined driving scenario is met.

The intuitive reality image layer and the plurality of intuitive add-on image layers are constructed to represent a reality view from a common observation point at a first distance behind the vehicle plus a second distance above the vehicle. The intuitive reality image layer and the plurality of intuitive add-on image layers comprise lanes and traffic information to sides and rear of the vehicle that are within regions unobservable directly through a windshield by a driver of the vehicle. The intuitive reality image layer and the plurality of intuitive add-on image layers are of a same orientation in a common three dimensional coordinate system.

Another embodiment of the present invention discloses a method for operating a dynamic information system. The dynamic information system includes a plurality of information collectors, a control module, and a display module.

The method includes collecting, by the plurality of information collectors, a plurality of environmental characteristics, generating, by the control module, an intuitive reality image layer of a vehicle and a plurality of intuitive add-on image layers corresponding to a plurality of predetermined driving scenarios, and displaying, by the display module, the intuitive reality image layer or in addition with at least one intuitive add-on image layer corresponding to a predetermined driving scenario when a condition of the predetermined driving scenario is met.

The intuitive reality image layer and the plurality of intuitive add-on image layers are constructed to represent a reality view from a common observation point at a first distance behind the vehicle plus a second distance above the vehicle. The intuitive reality image layer and the plurality of intuitive add-on image layers comprise lanes and traffic information to sides and rear of the vehicle that are within regions unobservable directly through a windshield by a driver of the vehicle. The intuitive reality image layer and the plurality of intuitive add-on image layers are of a same orientation in a common three dimensional coordinate system.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
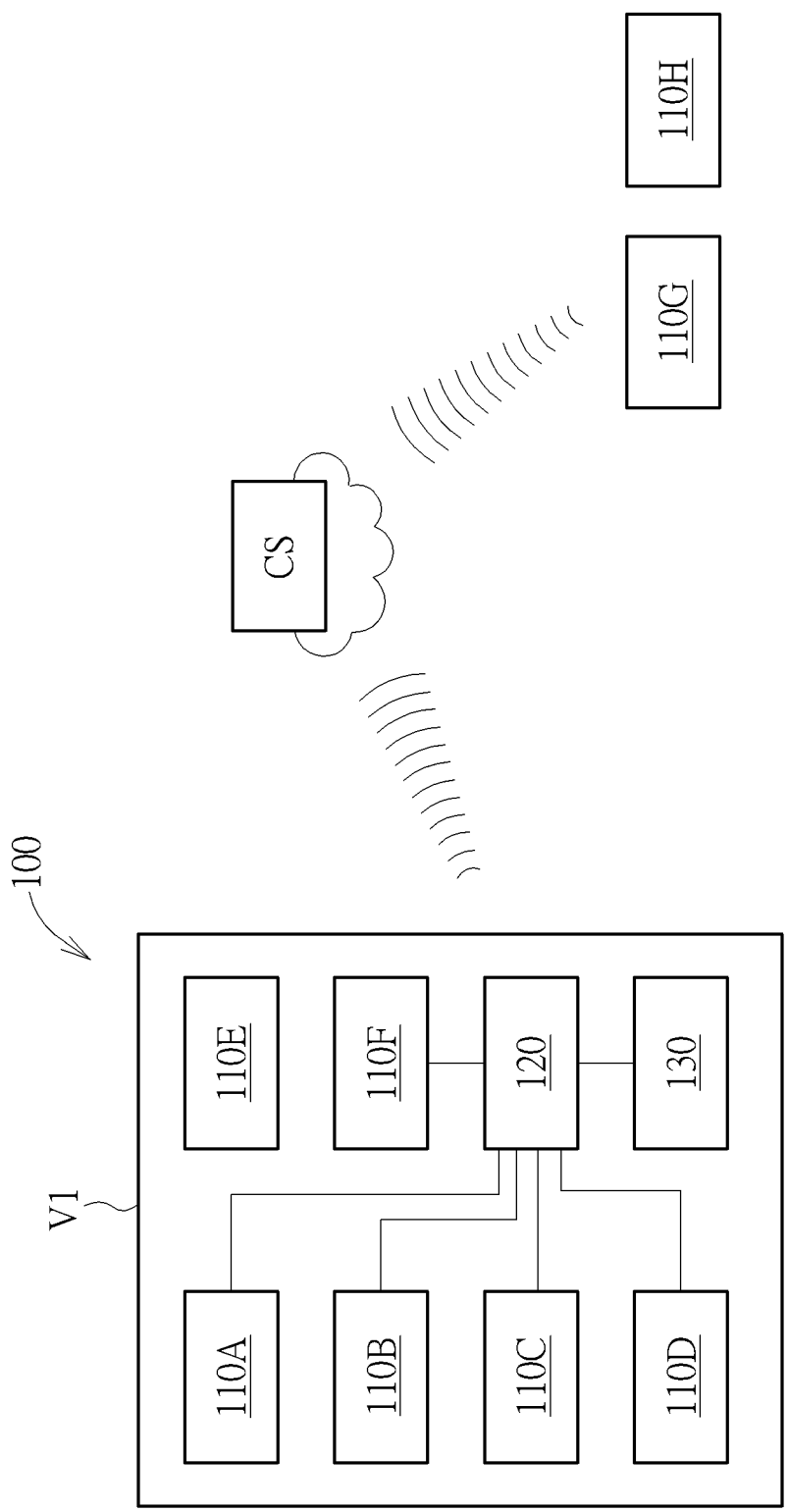
FIG. 1 shows a dynamic information system according to one embodiment of the present invention.

FIG. 1 shows a dynamic information system 100 according to one embodiment of the present invention. The dynamic information system 100 includes a plurality of information collectors 110A, 110B, 110C, 110D, 110E, and 110F, a control module 120, and a display module 130.

The information collectors 110A, 110B, 110C, 110D, 110E, and 110F can collect the environmental characteristics around them, such as the traffic condition images, the weather information, and the traffic conditions along the routes indicated by the navigation device. For example, the information collectors 110A, 110B, and 110C can be image capturing devices. In FIG. 1, the information collectors 110A, 110B, 110C are disposed at different positions in the vehicle V1 for capturing images from different angles and covering different regions. For example, the information collectors 110A, 110B, 110C can be installed as the front image capturing device, the side image capturing device, and a rear image capturing device according to the system need. In addition, the information collector 110D can be a distance measuring radar for measuring the distance between the external objects and the vehicle V1. The information collector 110E can be a gyroscope for detecting the situations of climbing and vibration. The information collector 110F can be a speed measuring radar for measuring the moving speeds of the external objects outside of the vehicle V1. Also, in some embodiments, the dynamic information system 100 can include other numbers and other types of information collectors, such as light radars, sonars, etc., for collecting even more complete information for the dynamic information system 100.

The control module 120 can be disposed in the vehicle V1, and can be coupled to the information collectors 110A, 110B, 110C, 110D, 110E, and 110F. The information collectors 110A, 110B, 110C, 110D, 110E, and 110F can generate the corresponding environmental characteristics by processing the data derived from sensing the external environment according to their functions. The environmental characteristics can be, for example, images, distances, temperatures, tilting orientations, etc., and the control module 120 can generate an intuitive reality image layer of a vehicle V1 and a plurality of intuitive add-on image layers corresponding to the vehicle V1 according to the environmental characteristics collected by the information collectors 110A, 110B, 110C, 110D, 110E, and 110F. In some embodiments, the plurality of intuitive add-on image layers generated by the control module 120 can present the traffic conditions of the vehicle lane on which the vehicle V1 is traveling, the speed of the vehicle V1, the navigation information of the vehicle V1, the traffic condition of the neighboring vehicle lanes, the speed of the neighboring vehicles, and/or the types of the neighboring vehicles.

In some embodiments, the control module 120 can receive the environmental characteristics collected by the information collectors 110A, 110B, 110C, 110D, 110E, and 110F through wired communications, wireless communications, or the combination of the two aforesaid ways of communications.

That is, according to the system need, the dynamic information system 100 can obtain the information collected by the information collector at a remote site through wireless communications. For example, the dynamic information system 100 can further include the information collectors 110G and 110H at remote sites away from the vehicle V1, and the information collectors 110G and 110H can capture the traffic condition images or the weather information on some specific routes (the route suggested by the navigation device, for example). The collected information can be transmitted to a cloud central system CS through the internet so the control module can obtain the information from the cloud central system CS through wireless communications. In the aforesaid embodiment, with the cloud central system CS, the information collectors 110A, 110B, 110C, 110D, 110E, and 110F disposed on the vehicle V1 can also upload the collected information and share the information with other dynamic information systems, and may also receive the information from the information collectors disposed in other vehicles. Consequently, the control module 120 of the dynamic information system 100 can obtain even more types of environmental characteristics from more places and can generate the intuitive add-on image layers according to the obtained environmental characteristics. The intuitive reality image layer and the plurality of intuitive add-on image layers can represent the lanes and the traffic information to the sides and rear of the vehicle that are within regions unobservable directly through the windshield by the driver of the vehicle.

Figure 2:
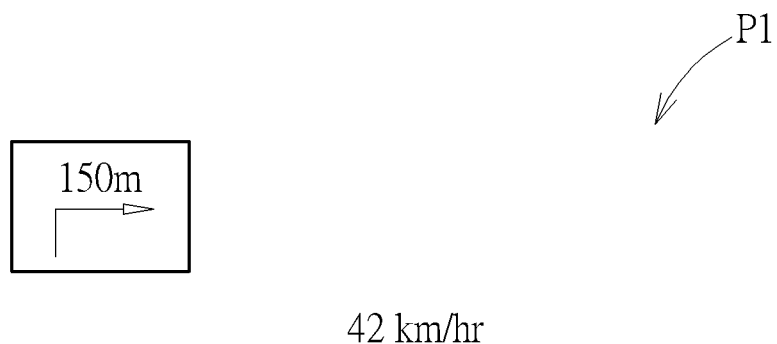
FIG. 2 shows an intuitive reality image layer according to one embodiment of the present invention.
Figure 2:
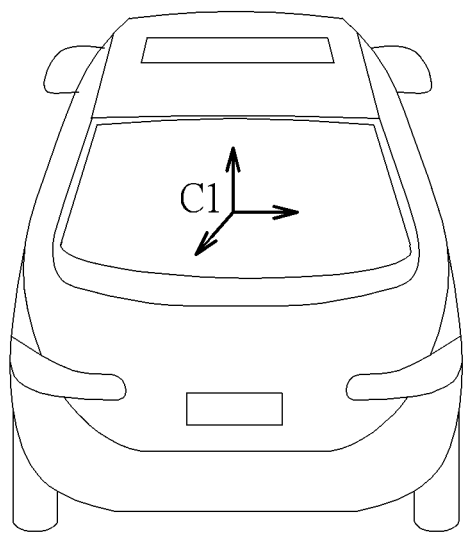

The wireless communications can be implemented by wireless LAN (WLAN), long term evolution-vehicle (LTE-V), dedicated short range communications (DSRC), etc. With wireless communications, the dynamic information system 100 can obtain the real-time information from the smart vehicles and the smart facilities near the roads, and can share the information collected by the information collectors 110A, 110B, 110C, 110D, 110E, and 110F with other smart vehicles and the smart facilities, enriching the reference information requested by other smart vehicles and smart facilities The display module 130 can be coupled to the control module 120, and can display the intuitive reality image layer P1 generated by the control module 120 when the vehicle V1 is activated. FIG. 2 shows the intuitive reality image layer P1 according to one embodiment of the present invention.

In FIG. 2, the intuitive reality image layer P1 can be illustrated as viewed from behind the vehicle V1 with a bird's eye for observing the vehicle V1 and the traffic conditions around the vehicle V1, including traffic conditions on two sides of the vehicle V1 and the rear side of the vehicle V1.

Figure 3:
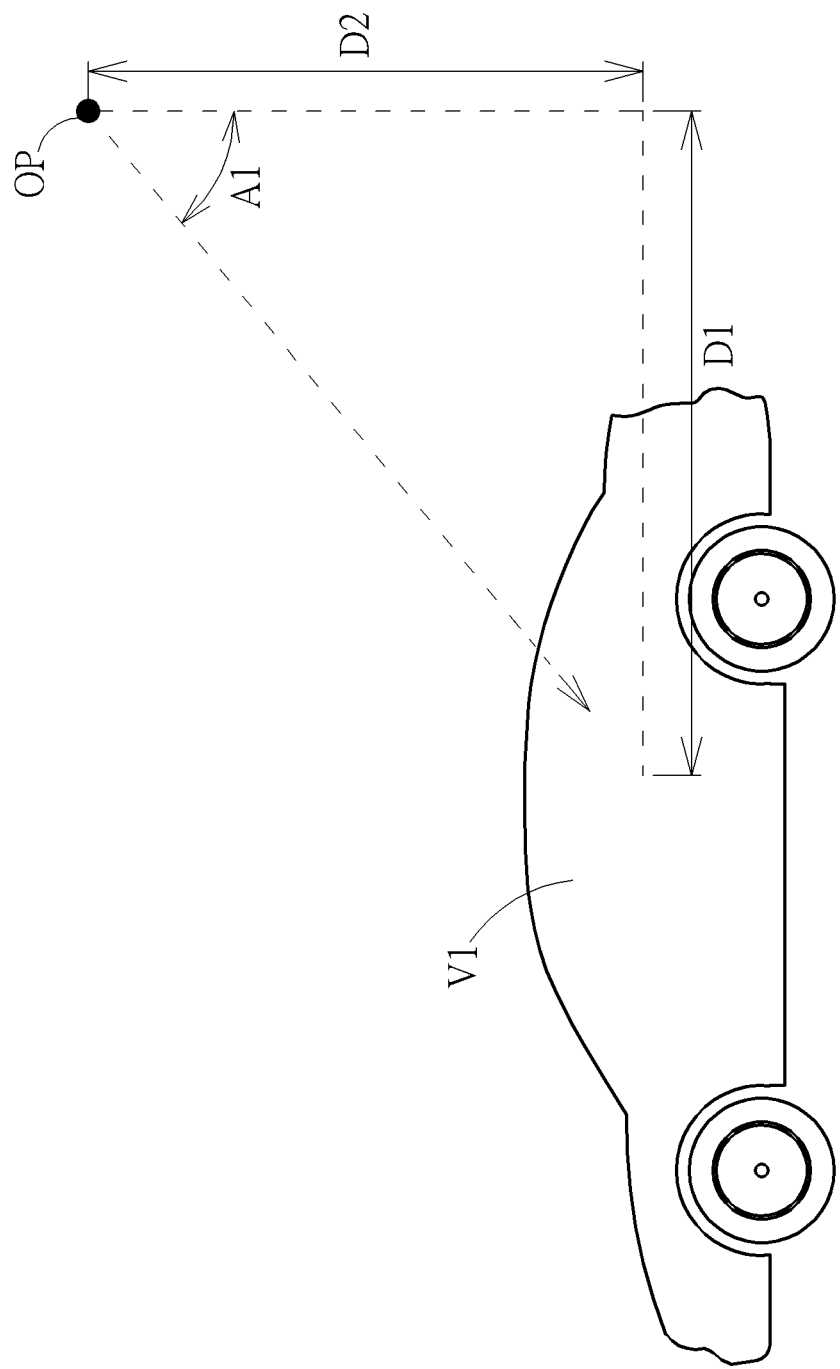
FIG. 3 shows an observing point when illustrating the intuitive reality image layer in FIG. 2.

For example, FIG. 3 shows an observing point OP for illustrating the intuitive reality image layer P1. In FIG. 3, the observing point OP is behind the vehicle V1 from a first distance D1 and above the vehicle V1 from a second distance D2. The first distance D1 and the second distance D2 can be determined by default or the user, and may be adjusted during driving according to the driving situation.

Since the intuitive reality image layer P1 can be constructed to represent the reality view from the observation point OP at the first distance D1 behind the vehicle V1 plus the second distance D2 above the vehicle V1, the content shown by the intuitive reality image layer P1 can be displayed in a consistent manner with the driver's vision when observing traffic condition through the windshield. That is, objects included in the intuitive reality image layer P1 would be displayed at the same relative positions as the real view observed from the windshield. Therefore, the discursive view provided by the reflection of the side mirrors used in prior art can be avoided, and the driver can obtain the information in an intuitive way.

In some embodiments, the angle A1 of the bird's eye view can range from 15 degrees to 90 degrees, and can be adjusted according to different situations. Here, 0 degrees represent the viewing angle is in parallel with the road and 90 degrees represent the viewing point is right above the vehicle V1.

In FIG. 2, some intuitive add-on image layers are also shown to present the moving speed of the vehicle V1, the position of the vehicle V1, and the navigation information. By illustrating the image as viewed from behind the vehicle V1 with a bird's eye, the intuitive reality image layer P1 can show two sides of the vehicle V1 and the rear side of the vehicle V1, and regions unobservable through the windshield by the driver.

Figure 4:
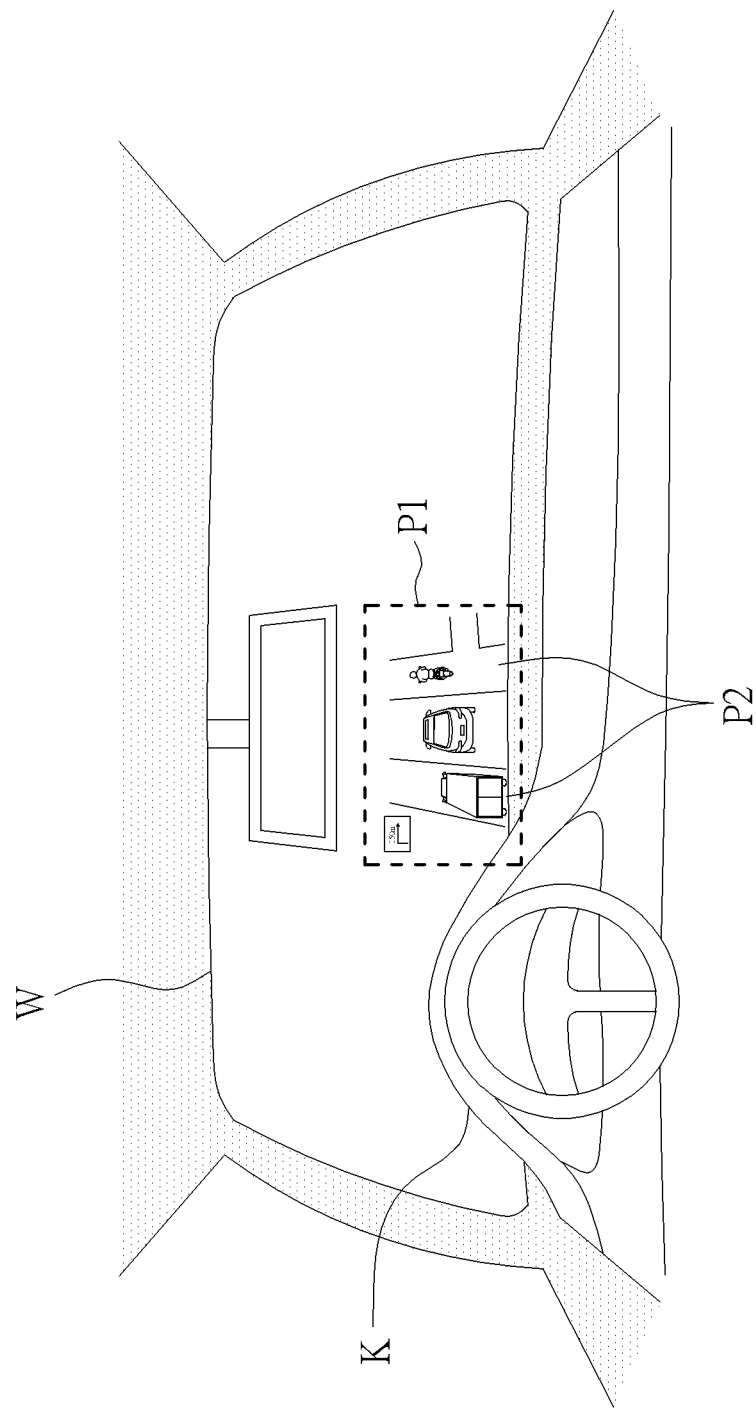
FIG. 4 shows a display module displaying the intuitive reality image layer and an intuitive add-on image layer in FIG. 2 on the windshield according to one embodiment of the present invention.

FIG. 4 shows a display module 130 displaying the intuitive reality image layer P1 and an intuitive add-on image layer P2 on the windshield W according to one embodiment of the present invention. In FIG. 4, the display module 130 can be a head-up display (HUD). Also, to prevent the intuitive reality image layer P1 and the intuitive add-on image layer P2 from blocking the line of sight of the driver, the display module 130 can project the intuitive reality image layer and the intuitive add-on image layers at the low side of the windshield W, that is, the regions close to the instrument panel K.

In some embodiments, the display module 130 can be a holographic display, or a transparent display disposed on the windshield W. The transparent display can, for example, be implemented by thin film transistors (TFT) or organic light emitting diodes (OLED). Consequently, when the transparent display displays the information image layers on the windshield, the driver can still see the external environment through the windshield. That is, the display module 130 can display the intuitive reality image layer P1 and the intuitive add-on image layer P2 in a region along the driver's line of sight when observing external environment through the windshield W so that the driver can see the intuitive reality image layer P1 and the intuitive add-on image layer P2 displayed by the display module 130 clearly along his/her line of sight.

In some embodiments, the control module 120 can include a graphics processing unit (GPU), and the control module 120 can generate the intuitive reality image layer P1 by combining, computing, and transforming the images captured by the information collectors 110A, 110B, and 110C according to the distance information derived by the information collector 110D, and the images captured by the information collectors 110A, 110B, and 110C. However, in addition to the aforesaid method for generating the intuitive reality image layer P1, the graphics processing unit of the control module 120 may also use other algorithms to calculate the depth information from the images captured by the information collectors 110A, 110B, and 110C directly if the information collectors 110A, 110B, and 110C are able to capture images from different angles for providing dual vision in some other embodiments. Consequently, the three dimensional images shown in the intuitive reality image layer P1 can present the relation between the vehicle P1 and the surrounding environment explicitly and dynamically. In some embodiments, the dynamic information system 100 can include even more image capture devices as information collectors for capturing more images and deriving the depth information.

Since the environmental characteristics collected by the information collectors 110A, 110B, 110C, 110D, 110E, and 110F are different, they may be used indifferent situations. To avoid showing too much information unnecessarily and distracting driver from directly perceiving the useful information, the display module 130 may display intuitive add-on image layers corresponding to a predetermined driving scenario when the condition of the predetermined driving scenario is encountered by the driver during his/her driving for the assisting the driver cope with the encountered situations. The predetermined driving scenario can be driving situations intended by the driver, such as applying the brakes, making a turn, and pulling over, or driving situations imposed by external environment, such as traffic jam, facing merging vehicles or chasing vehicles, etc.

Figure 5:
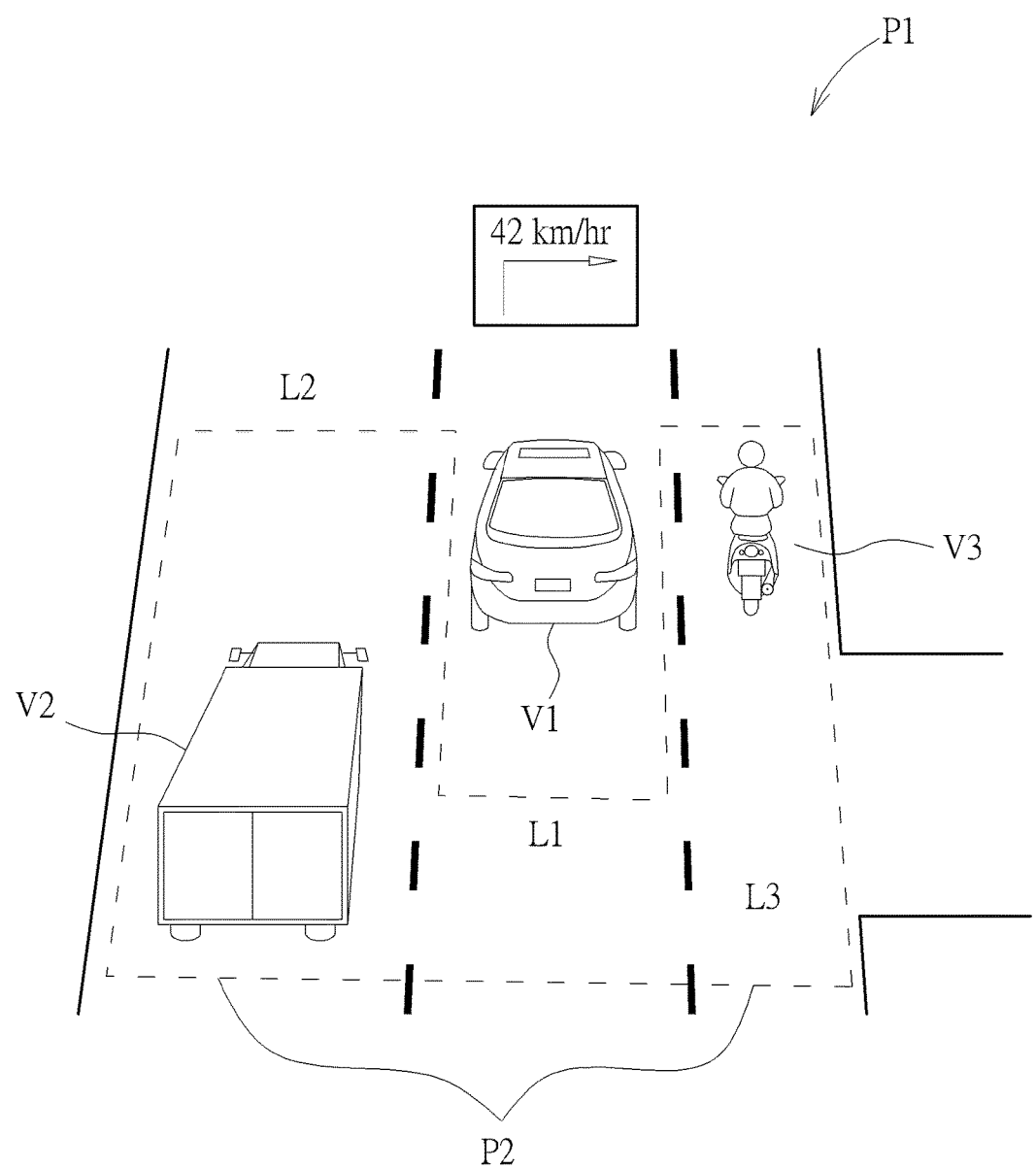
FIG. 5 shows the intuitive reality image layer and the corresponding intuitive add-on image layer displayed by the display module when a condition of a predetermined driving scenario is met.

For example, when the condition of a specific predetermined driving scenario is met, the display module 130 can display the intuitive reality image layer P1 and the intuitive add-on image layer corresponding to the predetermined driving scenarios on the windshield W of the vehicle V1 accordingly. FIG. 5 shows the intuitive reality image layer P1 and the corresponding intuitive add-on image layer P2 displayed by the display module 130 when the condition of the predetermined driving scenario is met. In FIG. 5, the intuitive add-on image layer P2 can present the traffic conditions of the neighboring vehicle lanes L2 and L3, the marking lines of the neighboring vehicle lanes L2 and L3, the positions of the neighboring vehicles V2 and V3, the sizes of the neighboring vehicles V2 and V3, and/or the types of the neighboring vehicles V2 and V3. That is, the intuitive reality image layer P1 and the corresponding intuitive add-on image layer P2 presented by the display module 130 can replace the left side view mirror, the right side view mirror, and the rear view mirror, and can present the traffic conditions on two sides of the vehicle V1 and the traffic condition behind the vehicle V1. However, the traffic conditions that can be observed through the windshield W may not be shown, avoiding distracting the driver by providing useless information. Also, according to the predetermined driving scenario, the dynamic information system 100 can further provide more information, allowing the driver to be aware of the traffic conditions without blind spots and to learn the information provided by the intuitive reality image layer P1 and the corresponding intuitive add-on image layer P2 when watching the windshield W without being distracted by looking at the mirrors, the instrument panels, or other control panels for information. Therefore, the driving operation can be simplified, and the driving safety can be improved.

In prior art, some of the vehicles may be equipped with cameras facing behind and to the sides of the vehicle have been introduced. Such vehicles typically present the captured images using a console, on the dashboard, or on the rear view mirror (replaced by a LCD display), which reduces the need to look in more than one direction at once, as well as removing blind spots. However, the images displayed to the driver by such vehicles, just as the mirror's reflections, are in the opposite orientation to the driver's (the driver is facing the front, yet the image displayed is as if the driver is looking backward), therefore the objects in the image cannot be intuitively perceived by the driver. Contrarily, the intuitive reality image layer P1 and the corresponding intuitive add-on image layer P2 are displayed with the same orientation to the driver's. Therefore, the information provided by the intuitive reality image layer P1 and the corresponding intuitive add-on image layer P2 can be received by the driver intuitively.

In FIG. 5, the intuitive add-on image layer P2 can also be a three dimensional image depicting the reality, and the intuitive add-on image layer P2 can be presented together with the intuitive reality image layer P1 according to the three dimensional coordination system C1 of the intuitive reality image layer P1 with the same observation point. For example, the three dimensional coordination system C1 used by the intuitive add-on image layer P2 can be compatible with the three dimensional coordination system C1 used by the intuitive reality image layer P1, and the two three dimensional coordination systems can have the same origin as shown in FIG. 5. Therefore, the intuitive add-on image layer P2 can be added onto the intuitive reality image layer P1 to present together with the intuitive reality image layer P1.

In some embodiments, the vehicle V1 in the intuitive reality image layer P1 shown in FIG. 2 is also depicted with the same three dimensional coordination system C1. When the display module 130 changes from displaying the image shown in FIG. 2 to displaying the image shown in FIG. 5, the position of the graphic indicator of the vehicle V1 in the intuitive reality image layer P1 will not be changed, so the driver can locate the vehicle V1 directly without spending time looking for the figure of vehicle V1 (or the graphic indicator of vehicle V1) even when the intuitive add-on image layer P2 shows up, reducing the driver's burden.

Since the intuitive reality image layer P1 and the intuitive add-on image layer P2 are of the same orientation with respect to the common three dimensional coordinate system, the driver can perceive the information instantly without reconfiguring the relation between the objects displayed by the newly appeared image layer (P2) and the objects displayed by the previously presented image layer (P1).

That is, when the display module 130 displays the intuitive reality image layer P1 and the intuitive add-on image layer P2, the position of the neighboring vehicle lanes L2 and L3, and the positions of the neighboring vehicles V2 and V3 presented by the intuitive add-on image layer P2 and the position of the vehicle V1 presented by the intuitive reality image layer 1 are presented according to the relative positions of the vehicle V1, the neighboring vehicle lanes L2 and L3, and the neighboring vehicles V2 and V3 sensed by the plurality of information collectors 110A, 110B, and 110C. Therefore, the driver can identify the traffic conditions according to the intuitive reality image layer P1 and the intuitive add-on image layer P2 instinctively, and take the corresponding actions.

Figure 6:
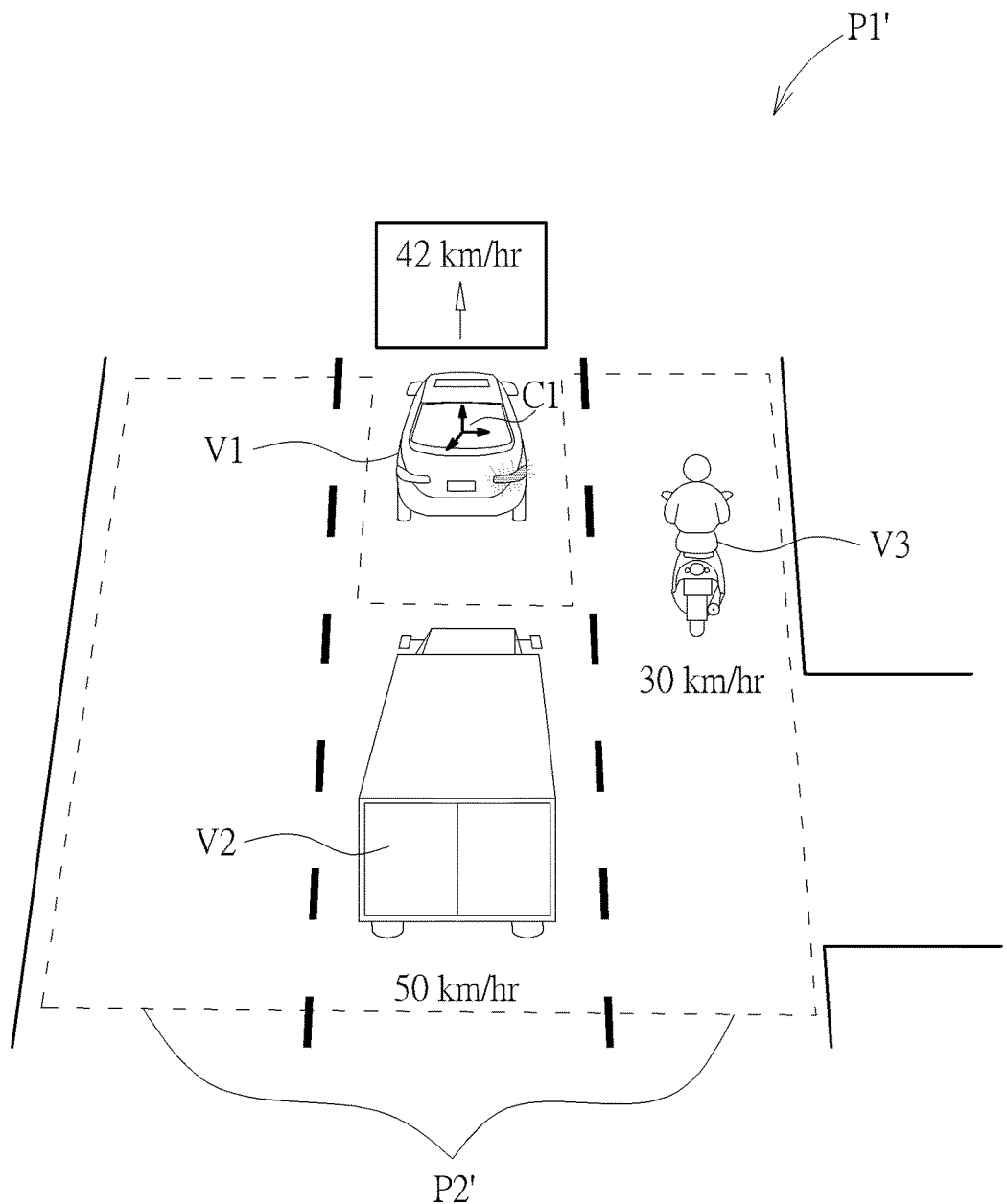
FIG. 6 shows the intuitive reality image layer and the corresponding intuitive add-on image layer displayed by the display module when the direction indicator of the vehicle is triggered.

FIG. 6 shows the intuitive reality image layer P1' and the corresponding intuitive add-on image layer P2' displayed by the display module 130 according to one embodiment of the present invention when the direction indicator of the vehicle V1 is triggered. In FIG. 6, the intuitive add-on image layer P2' can present the traffic condition of the vehicle lanes L2 and L3 adjacent to the vehicle lane L1 on which the vehicle V1 is traveling, the marking lines of the vehicle lanes L2 and L3, the speed of the neighboring vehicles V2 and V3, the positions of the neighboring vehicles V2 and V3, the sizes of the neighboring vehicles V2 and V3, and/or the types of the neighboring vehicles V2 and V3. Therefore, the driver can be aware of the traffic conditions on two sides of the vehicle V1 and the traffic condition behind the vehicle V1 according to the content presented by the intuitive reality image layer P1' and the corresponding intuitive add-on image layer P2' without moving his/her line of sight. Also, since the intuitive add-on image layer P2' can present the speeds of the neighboring vehicles V2 and V3, the driver can take actions even more accurately according to the information provided by the intuitive reality image layer P1' and the corresponding intuitive add-on image layer P2' when making a turn, preventing the driver from misjudging the speed of the neighboring vehicle and causing accidents.

In addition, the intuitive reality image layer P1' and the corresponding intuitive add-on image layer P2' shown in FIG. 6 are examples for purpose of explanation. In some embodiments, the information presented by the intuitive reality image layer P1' may also include parts of the information shown in the corresponding intuitive add-on image layer P2'. For example, in some embodiments, to allow the driver to be aware of the traffic conditions on two sides of the vehicle V1 and the rear side of the vehicle V1, the control module 120 can also include the traffic conditions on two sides of the vehicle V1 and the rear side of the vehicle V1 when generating the intuitive reality image layer P1' for the display module 130. And the information of the speeds of the neighboring vehicles will be provided only when the condition of the corresponding predetermined driving scenario is met. That is, the designer can design the initial intuitive reality image layer P1' according to the requirement, and present the corresponding intuitive add-on image layers for providing the information required by different situations accordingly.

Furthermore, since the display module 130 can automatically present the intuitive reality image layer P1' and the corresponding intuitive add-on image layer P2' when the direction indicator of the vehicle V1 is triggered, the manual operations can be skipped, allowing the driver to keep concentration on his/her driving and assisting the driver effectively.

In some embodiments, in addition to determining whether to display the intuitive add-on image layer P2' according to the triggering of the direction indicator, the display module 130 can also determine to display the intuitive reality image layer P1' and the corresponding intuitive add-on image layer P2' when the navigation device of the vehicle V1 indicates the vehicle V1 is about to make a turn within a predetermined distance, for example, to make a turn in 200 meters. Also, in some embodiments, the display module 130 may identify the predetermined driving scenario by other means, for example, the display module 130 may identify whether the viewing angles have been changed and/or whether the vehicle V1 is touching the marking line of the vehicle lane according to the images captured by the information collectors 110A, 110B, and 110C. By identifying these situations, the display module 130 can further identify whether the vehicle V1 is making a turn or about to make a turn, and display the intuitive reality image layer P1' and the corresponding intuitive add-on image layer P2' for assisting the driver accordingly. Consequently, the dynamic information system 100 can assist the driver to cope with all kinds of driving situations automatically.

That is, the display module 130 can not only show the corresponding image layers to assist the driver when the vehicle is making a turn, but also show other corresponding images layers to assist the driver in other different situations. Especially in some situations, since the driver may not be able to learn the required information by observing through the windshield W directly, the display module 130 can be used to provide additional environmental information to help the driver to deal with the situations.

In addition to the predetermined driving scenarios mentioned above, the control module 120 may also generated other different intuitive add-on image layers corresponding to other kinds of predetermined driving scenarios in some embodiments. For example, when the vehicle V1 decelerates over a predetermined threshold, a traffic light ahead of the vehicle V1 within a predetermined distance turns red, or a traffic jam occurs ahead of the vehicle V1 within a predetermined distance, the control module 120 can generate the corresponding intuitive add-on image layers to present the rear vehicle behind the vehicle V1, the speed of the rear vehicle, and the type of the rear vehicle. Or, when a rear vehicle is tailgating the vehicle V1, an adjacent vehicle moves towards the vehicle V1, or the adjacent vehicle triggers a direction indicator indicating the adjacent vehicle is to move closer to the vehicle V1, the control module 120 can generate the intuitive add-on image layer corresponding to these predetermined driving scenarios to present the rear vehicle behind the vehicle V1, the speed of the rear vehicle, the type of the rear vehicle, the adjacent vehicle beside the vehicle V1, the speed of the adjacent vehicle, and/or the type of the adjacent vehicle. Or, when the rear vehicle behind the vehicle V1 is identified to be an emergency vehicle, such as an ambulance, a police car or a fire engine, the control module 120 can generate the intuitive add-on image layer corresponding to the predetermined driving scenario to present information alerting the vehicle V1 to yield its vehicle lane.

That is, the display module 130 can not only display the intuitive reality image layer of the vehicle V1, but also display the corresponding intuitive add-on image layers for providing the required information to the driver instantly when the condition of the predetermined driving scenario is met. Also, the viewing angle of the intuitive reality image layer may also be adjusted according to the need of different driving scenarios.

In summary, when the condition of the predetermined driving scenario is met, for example, but not limited to, the direction indicator being triggered, the navigation device indicating to make a turn, reversing into a garage, traffic light turning red, etc., the dynamic information system 100 can have the display module 130 display the intuitive reality image layer and at least one intuitive add-on image layer corresponding to the predetermined driving scenario on the windshield W of the vehicle V1 for assisting the driver to deal with all kinds of driving situations.

Furthermore, the control module 120 can generate all intuitive add-on image layers, such as the intuitive add-on image layers respectively presenting the types and speed of the rear vehicles, the types and speeds of the neighboring vehicles, the marking lines of the vehicle lane on which the vehicle V1 is traveling on, and the marking lines of the neighboring vehicle lanes, at all times according to the environmental characteristics collected by the information collectors 110A, 110B, 110C, 110D, 110E, and 110F. Therefore, once the predetermined driving scenario is met, the display module 130 can display the intuitive add-on image layers corresponding to the predetermined driving scenario instantly. However, in some embodiments, the control module 120 can also generate the corresponding intuitive add-on image layers for the display module 130 to display after the condition of the predetermined driving scenario is met. Consequently, the computation resource and the power consumption can be saved.

Figure 7:
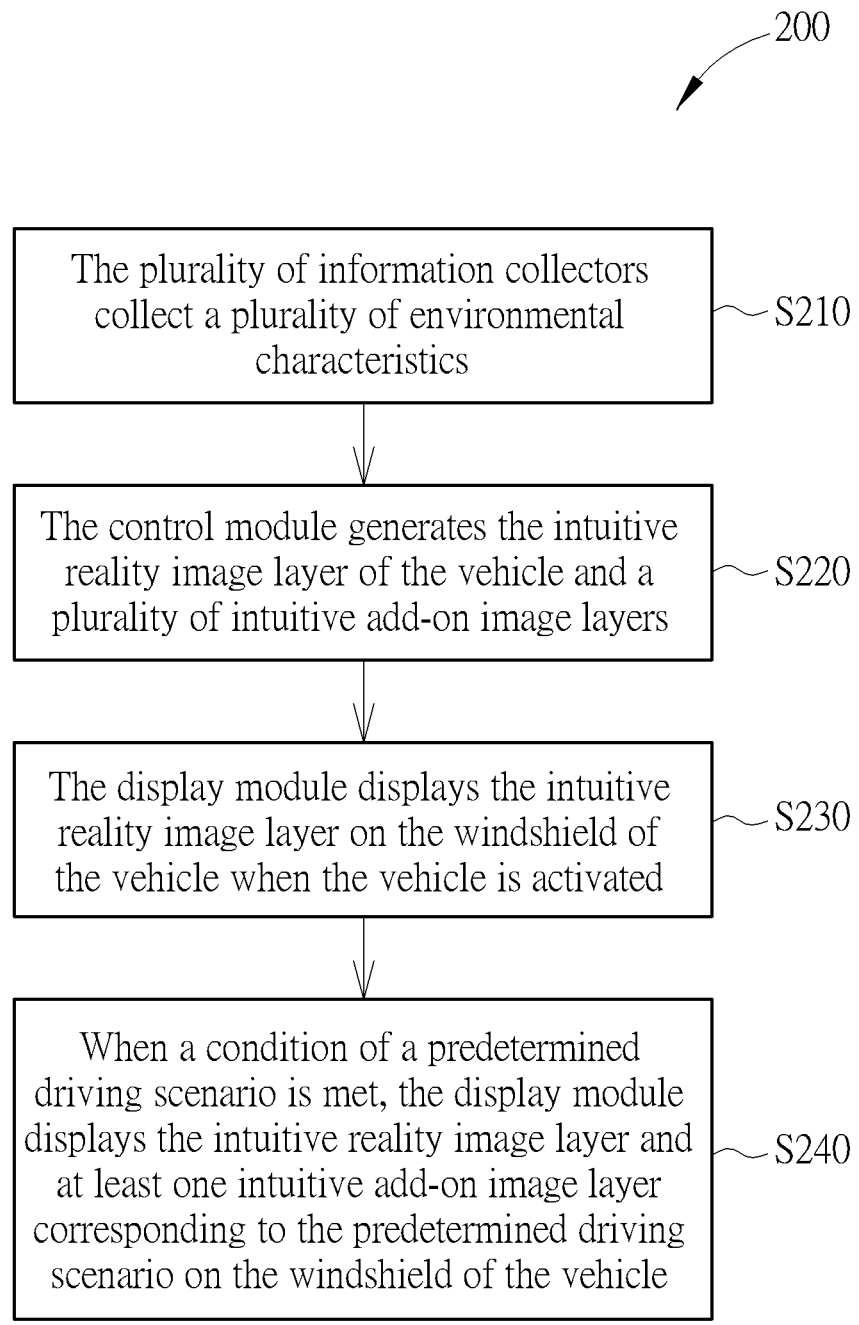
FIG. 7 shows a method for operating the dynamic information system in FIG. 1 according to one embodiment of the present invention.

FIG. 7 shows a method 200 for operating the dynamic information system 100 according to one embodiment of the present invention. The method 200 includes steps S210 to S240, but not limited to the sequence below.

S210: the plurality of information collectors 110A, 110B, 110C, 110D, 110E, and 110F collect a plurality of environmental characteristics;

S220: the control module 120 generates the intuitive reality image layer of the vehicle V1 and a plurality of intuitive add-on image layers;

S230: the display module 130 displays the intuitive reality image layer P1 on the windshield W of the vehicle V1 when the vehicle V1 is activated;

S240: when a condition of a predetermined driving scenario is met, the display module 130 displays the intuitive reality image layer and at least one intuitive add-on image layer corresponding to the predetermined driving scenario on the windshield of the vehicle V1.

In FIG. 7, the control module 120 can generate all intuitive add-on image layers in step S220; however, in some embodiments, the control module 120 can also generate the intuitive add-on image layers corresponding to the predetermined driving scenario for the display module 130 to display after the condition of the predetermined driving scenario is met. For example, the control module 120 may generate the intuitive add-on image layer presenting the speed of the rear vehicle when the speed of the rear vehicle is required, and generate the intuitive add-on image layer presenting the type of the rear vehicle when the type of the rear vehicle is required.

In step S220, the graphics processing unit (GPU) of the control module 120 can generate the intuitive reality image layers P1 and P3 and the intuitive add-on image layers P2 and P4 by combining, computing, and transforming the images captured by the information collectors 110A, 110B, and 110C according to the information collected by some of the information collectors, such as the images captured by the information collectors 110A, 110B, and 110C, the information collected by the remote information collectors 110G and 110H and/or the distance information derived by the information collector 110D.

However, the present invention is not limited to using the aforesaid process for generating the intuitive reality image layers P1 and P3 and the intuitive add-on image layers P2 and P4. In some embodiments, the control module 120 may use other algorithms to calculate the depth information from the images captured by the information collectors 110A, 110B, and 110C directly and generate the intuitive reality image layers P1 and P3 and the intuitive add-on image layers P2 and P4 if the information collectors 110A, 110B, and 110C are able to capture images from different angles for providing dual vision in some other embodiments.

In summary, the dynamic information system and the method for operating the dynamic information system provided by the embodiments of the present invention can generate and display the corresponding intuitive add-on image layers according to the situations encountered by the driver when driving the vehicle for providing the required information. Furthermore, since the display module can display the intuitive reality image layer and the intuitive add-on image layers in a region along the driver's region of sight when observing external environments through a windshield so that the driver is able to see the intuitive reality image layer and the intuitive add-on image layers clearly along his line of sight. Different from the prior art that the driver still needs to take a look at the side view mirrors and the rear view mirror when using head-up display, the dynamic information system of the present invention allows the drivers to focus their line of sight to the front, improving the driving safety and simplifying the driving operations.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A dynamic information system of a vehicle comprising:
   a plurality of information collectors;
   a control module coupled to the plurality of information collectors, and configured to generate an intuitive reality image layer of the vehicle and a plurality of intuitive add-on image layers corresponding to a plurality of predetermined driving scenarios; and
   a display module coupled to the control module, and configured to display the intuitive reality image layer or in addition with at least one intuitive add-on image layer corresponding to a predetermined driving scenario when a condition of the predetermined driving scenario is met;

wherein:
the intuitive reality image layer and the plurality of intuitive add-on image layers are constructed to represent a reality view from a common observation point at a first distance behind the vehicle plus a second distance above the vehicle;
the intuitive reality image layer and the plurality of intuitive add-on image layers comprise lanes and traffic information to sides and rear of the vehicle that are within regions unobservable directly through a windshield by a driver of the vehicle; and
the intuitive reality image layer and the plurality of intuitive add-on image layers are generated according to a same observation point with a same orientation in a common three dimensional coordinate system.

2. The dynamic information system of claim 1, wherein the display module is further configured to display the intuitive reality image layer when the vehicle is activated, and the intuitive reality image layer comprises a graphic indicator of the vehicle, speed of the vehicle, and navigation information.

3. The dynamic information system of claim 1, wherein:
the predetermined driving scenario is a direction indicator of the vehicle being triggered; and
the at least one intuitive add-on image layer corresponding to the predetermined driving scenario presents a rear vehicle behind the vehicle, a speed of the rear vehicle, a type of the rear vehicle, a traffic condition of at least one neighboring vehicle lane, marking lines of the at least one neighboring vehicle lane, a speed of at least one neighboring vehicle traveling on the at least one neighboring vehicle lane, a position of the rear vehicle, a position of the at least one neighboring vehicle, and/or a type of the at least one neighboring vehicle.

4. The dynamic information system of claim 3, wherein:
when the display module displays the at least one intuitive add-on image layer and the intuitive reality image layer, the position of the rear vehicle, a position of the at least one neighboring vehicle lane, and the position of the at least one neighboring vehicle presented by the at least one intuitive add-on image layer and a position of the vehicle presented by the intuitive reality image layer are presented according to relative positions of the vehicle, the rear vehicle, the at least one neighboring vehicle lane, and the at least one neighboring vehicle sensed by the plurality of information collectors.

5. The dynamic information system of claim 1, wherein:
the predetermined driving scenario is a navigation device of the vehicle indicating the vehicle is about to make a turn within a predetermined distance according to a navigation route provided by the navigation device; and
the at least one intuitive add-on image layer corresponding to the predetermined driving scenario presents a rear vehicle behind the vehicle, a speed of the rear vehicle, a type of the rear vehicle, a traffic condition of at least one neighboring vehicle lane, marking lines of the at least one neighboring vehicle lane, a speed of at least one neighboring vehicle traveling on the at least one neighboring vehicle lane, a position of the rear vehicle, a position of the at least one neighboring vehicle, and/or a type of the at least one neighboring vehicle.

6. The dynamic information system of claim 5, wherein:
when the display module displays the at least one intuitive add-on image layer and the intuitive reality image layer, the position of the rear vehicle, a position of the at least one neighboring vehicle lane, and the position of the at least one neighboring vehicle presented by the at least one intuitive add-on image layer and a position of the vehicle presented by the intuitive reality image layer are presented according to relative positions of the vehicle, the rear vehicle, the at least one neighboring vehicle lane, and the at least one neighboring vehicle sensed by the plurality of information collectors.

7. The dynamic information system of claim 1, wherein:
the predetermined driving scenario is the vehicle decelerating over a predetermined threshold, a traffic light ahead of the vehicle within a predetermined distance turning red, or a traffic jam occurring ahead within a predetermined distance of the vehicle; and
the at least one intuitive add-on image layer corresponding to the predetermined driving scenario presents a rear vehicle behind the vehicle, a speed of the rear vehicle, and a type of the rear vehicle.

8. The dynamic information system of claim 1, wherein:
the predetermined driving scenario is a rear vehicle tailgating the vehicle, an adjacent vehicle moving towards the vehicle, or the adjacent vehicle triggering a direction indicator indicating the adjacent vehicle is to move closer the vehicle; and
the at least one intuitive add-on image layer corresponding to the predetermined driving scenario presents the rear vehicle behind the vehicle, a speed of the rear vehicle, a type of the rear vehicle, the adjacent vehicle beside the vehicle, a speed of the adjacent vehicle, and/or a type of the adjacent vehicle.

9. The dynamic information system of claim 1, wherein:
the predetermined driving scenario is a rear vehicle behind the vehicle being an emergency vehicle; and
the at least one intuitive add-on image layer corresponding to the predetermined driving scenario presents information alerting the vehicle to yield its vehicle lane.

10. The dynamic information system of claim 1, wherein:
the display module is a head-up display (HUD).

11. The dynamic information system of claim 1, wherein the information collectors collects traffic condition images near the vehicle, weather information, and traffic conditions along routes indicated by a navigation device.

12. The dynamic information system of claim 1, wherein the control module generates the plurality of intuitive add-on image layers corresponding to a predetermined driving scenario when the condition of the predetermined driving scenario is met.

13. A method for operating a dynamic information system, the dynamic information system comprising a plurality of information collectors, a control module, and a display module, and the method comprising:
collecting, by the plurality of information collectors, a plurality of environmental characteristics;
generating, by the control module, an intuitive reality image layer of a vehicle and a plurality of intuitive add-on image layers corresponding to a plurality of predetermined driving scenarios; and
displaying, by the display module, the intuitive reality image layer or in addition with at least one intuitive add-on image layer corresponding to a predetermined driving scenario when a condition of the predetermined driving scenario is met;
wherein:

the intuitive reality image layer and the plurality of intuitive add-on image layers are constructed to represent a reality view from a common observation point at a first distance behind the vehicle plus a second distance above the vehicle;

the intuitive reality image layer and the plurality of intuitive add-on image layers comprise lanes and traffic information to sides and rear of the vehicle that are within regions unobservable directly through a windshield by a driver of the vehicle; and the intuitive reality image layer and the plurality of intuitive add-on image layers are generated according to a same observation point with a same orientation in a common three dimensional coordinate system.

14. The method of claim 13, further comprising the display module displaying the intuitive reality image layer when the vehicle is activated.

15. The method of claim 13, wherein:

the predetermined driving scenario is a direction indicator of the vehicle being triggered; and the at least one intuitive add-on image layer corresponding to the predetermined driving scenario presents a rear vehicle behind the vehicle, a speed of the rear vehicle, a type of the rear vehicle, a traffic condition of at least one neighboring vehicle lane, marking lines of the at least one neighboring vehicle lane, a speed of at least one neighboring vehicle traveling on the at least one neighboring vehicle lane, a position of the rear vehicle, a position of the at least one neighboring vehicle, and/or a type of the at least one neighboring vehicle.

16. The method of claim 15, wherein:

when the display module displays the at least one intuitive add-on image layer and the intuitive reality image layer, the position of the rear vehicle, a position of the at least one neighboring vehicle lane, and the position of the at least one neighboring vehicle presented by the at least one intuitive add-on image layer and a position of the vehicle presented by the intuitive reality image layer are presented according to relative positions of the vehicle, the rear vehicle, the at least one neighboring vehicle lane, and the at least one neighboring vehicle sensed by the plurality of information collectors.

17. The method of claim 13, wherein:

the predetermined driving scenario is a navigation device of the vehicle indicating the vehicle is about to make a turn within a predetermined distance according to a navigation route provided by the navigation device; and the at least one intuitive add-on image layer corresponding to the predetermined driving scenario presents a rear vehicle behind the vehicle, a speed of the rear vehicle, a type of the rear vehicle, a traffic condition of at least one neighboring vehicle lane, marking lines of the at least one neighboring vehicle lane, a speed of at least one neighboring vehicle traveling on the at least one neighboring vehicle lane, a position of the rear vehicle, a position of the at least one neighboring vehicle, and/or a type of the at least one neighboring vehicle.

18. The method of claim 17, wherein:

when the display module displays the at least one intuitive add-on image layer and the intuitive reality image layer, the position of the rear vehicle, a position of the at least one neighboring vehicle lane, and the position of the at least one neighboring vehicle presented by the at least one intuitive add-on image layer and a position of the vehicle presented by the intuitive reality image layer are presented according to relative positions of the vehicle, the rear vehicle, the at least one neighboring vehicle lane, and the at least one neighboring vehicle sensed by the plurality of information collectors.

19. The method of claim 13, wherein:

the predetermined driving scenario is the vehicle decelerating over a predetermined threshold, a traffic light ahead of the vehicle within a predetermined distance turning red, or a traffic jam occurring ahead within a predetermined distance of the vehicle; and the at least one intuitive add-on image layer corresponding to the predetermined driving scenario represents a rear vehicle behind the vehicle, a speed of the rear vehicle, and a type of the rear vehicle.

20. The method of claim 13, wherein:

the predetermined driving scenario is a rear vehicle tailgating the vehicle, an adjacent vehicle moving towards the vehicle, or the adjacent vehicle triggering a direction indicator indicating the adjacent vehicle is to move closer the vehicle; and the at least one intuitive add-on image layer corresponding to the predetermined driving scenario represents the rear vehicle behind the vehicle, a speed of the rear vehicle, a type of the rear vehicle, the side vehicle beside of the vehicle, a speed of the side vehicle, and/or a type of the side vehicle.

* * * * *